(12) United States Patent
Nouzuka et al.

(10) Patent No.: US 9,825,303 B2
(45) Date of Patent: Nov. 21, 2017

(54) STORAGE BATTERY GRID, METHOD OF MANUFACTURING STORAGE BATTERY GRID, AND STORAGE BATTERY USING STORAGE BATTERY GRID

(71) Applicant: GS Yuasa International Ltd., Kyoto-shi, Kyoto (JP)

(72) Inventors: Kiyoshi Nouzuka, Kyoto (JP); Kazuma Saito, Kyoto (JP); Hiroyuki Ishiguro, Kyoto (JP); Kohei Fujita, Kyoto (JP); Shota Iwasaki, Kyoto (JP); Junichi Nishizawa, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 271 days.

(21) Appl. No.: 14/272,940

(22) Filed: May 8, 2014

(65) Prior Publication Data

US 2014/0356727 A1    Dec. 4, 2014

(30) Foreign Application Priority Data

May 31, 2013 (JP) ................................. 2013-115758
May 31, 2013 (JP) ................................. 2013-115881

(51) Int. Cl.
  *H01M 4/73* (2006.01)
  *H01M 4/04* (2006.01)
  *H01M 10/34* (2006.01)

(52) U.S. Cl.
  CPC ............ *H01M 4/73* (2013.01); *H01M 10/345* (2013.01); *Y02E 60/124* (2013.01); *Y02P 70/54* (2015.11); *Y10T 29/10* (2015.01)

(58) Field of Classification Search
  CPC .............................. H01M 4/742; H01M 10/06
  See application file for complete search history.

(56) References Cited

U.S. PATENT DOCUMENTS

| 440,216 A | * | 11/1890 | Woolf | ..................... H01M 2/18 |
| | | | | 429/241 |
| 1,069,809 A | * | 8/1913 | Prince | ..................... H01M 4/73 |
| | | | | 429/211 |

(Continued)

FOREIGN PATENT DOCUMENTS

| CN | 201616473 | 10/2010 |
| EP | 2747179 | 6/2014 |

(Continued)

OTHER PUBLICATIONS

International Search Report dated Sep. 17, 2013 filed in PCT/JP2013/004464.

(Continued)

*Primary Examiner* — Kenneth Douyette
(74) *Attorney, Agent, or Firm* — Rankin, Hill & Clark LLP (57) ABSTRACT

A storage battery grid includes: a frame bone that includes a substantially rectangular shape; a lug portion that is connected to a first side portion of the frame bone and projects outwardly from the frame bone; a main bone that extends from the first side portion to a second side portion which is opposed to the first side portion; and a plurality of first sub-bones that extend obliquely toward the second side portion, at least part of the plurality of first sub-bones branching from the main bone toward both sides, wherein at least part of the plurality of first sub-bones is bent.

18 Claims, 9 Drawing Sheets

(56) References Cited

U.S. PATENT DOCUMENTS

| | | | | |
|---|---|---|---|---|
| 1,364,760 A * | 1/1921 | Holland | ............... | H01M 4/72 429/241 |
| 1,380,962 A * | 6/1921 | Holland | ............... | H01M 4/72 429/243 |
| 1,440,354 A * | 12/1922 | Hanna | ............... | H01M 4/72 429/233 |
| 1,639,641 A * | 8/1927 | Cole | ............... | H01M 4/82 226/117 |
| 3,909,293 A * | 9/1975 | Hammond | ............... | H01M 4/72 139/425 R |
| 3,923,545 A * | 12/1975 | Margulies | ............... | H01M 4/73 429/211 |
| 4,555,459 A | 11/1985 | Anderson et al. | | |
| 5,601,953 A | 2/1997 | Schenk | | |
| 5,989,749 A | 11/1999 | Kao et al. | | |
| 6,245,462 B1 | 6/2001 | Kao et al. | | |
| 2014/0212764 A1 | 7/2014 | Fujita et al. | | |

FOREIGN PATENT DOCUMENTS

| | | |
|---|---|---|
| JP | 48-11314 | 2/1973 |
| JP | 54-056132 | 4/1979 |
| JP | 54-056133 | 4/1979 |
| JP | 55-104261 | 7/1980 |
| JP | 61-5724 | 2/1986 |
| JP | 61-49978 | 4/1986 |
| JP | 62-117269 | 5/1987 |
| JP | 3-62455 | 6/1991 |
| JP | 06-236760 | 8/1994 |
| JP | 07-105942 | 4/1995 |
| JP | 07-235307 | 9/1995 |
| JP | 07-282813 | 10/1995 |
| JP | 07-320743 | 12/1995 |
| JP | 08-002921 | 1/1996 |
| JP | 2001-085045 | 3/2001 |
| JP | 2001-236964 | 8/2001 |
| JP | 2001-524736 | 12/2001 |
| JP | 2002-042821 | 2/2002 |
| JP | 2002-093409 | 3/2002 |
| JP | 2003-529892 | 10/2003 |
| JP | 2004-063153 | 2/2004 |
| JP | 2004-119023 | 4/2004 |
| JP | 2005-158755 | 6/2005 |
| JP | 2007-123204 | 5/2007 |
| JP | 2008-277159 | 11/2008 |
| JP | 4884748 | 2/2012 |
| WO | 2014/038123 | 3/2014 |

OTHER PUBLICATIONS

Extended European Search Report dated Sep. 29, 2014 issued in the corresponding European patent application No. 14168382.1.

* cited by examiner

STORAGE BATTERY GRID, METHOD OF MANUFACTURING STORAGE BATTERY GRID, AND STORAGE BATTERY USING STORAGE BATTERY GRID

CROSS-REFERENCE TO RELATED APPLICATIONS

This application claims the benefit of Japanese patent application No. 2013-115881 and Japanese patent application No. 2013-115758, filed on May 31, 2013, which are incorporated herein by reference.

FIELD

The present invention relates to a storage battery grid, a method of manufacturing storage battery grid, and a storage battery using the storage battery grid.

BACKGROUND

An expanded grid (i.e., a net-like grid) obtained by forming slits in, for example, a zigzag manner on a lead alloy sheet, followed by expanding, has been conventionally used as a grid for use in a storage battery, as disclosed in JP-A-7-320743. The expanded grid includes, an upper frame having a lug portion formed thereat, a lower frame opposed to the upper frame, and a net-like frame formed between the upper frame and the lower frame. A space defined by the upper frame, the lower frame, and the netlike frame is filled with an active material, thereby constituting an electrode plate.

However, the expanded grid has no frame bone for connecting the upper frame and the lower frame to each other on right and left sides, and therefore, is liable to be elongated in a vertical direction, thereby raising a problem that short-circuiting is liable to occur. The expanded grid, does not have a frame bone, and therefore, the net-like frame between the upper and lower frames is serrate from the upper frame to the lower frame. Consequently, a current channel up to the lower frame from the lug portion becomes long, thereby increasing an electric resistance. Consequently, a potential distribution becomes uneven over the entire electrode plate, thereby raising problems of local corrosion and a short lifetime of the electrode plate.

In the meantime, a grid including, inside of a square frame bone, many lateral frames parallel to each other and many radial frames radially extending from a lug portion disposed on an upper side portion of the frame bone is conceived as a grid for use in a storage battery, as disclosed in JP-Y-8-2921. The radial frames are formed with branch frames. Each of the branch frames includes: a branch starting frame extending sideways at a large angle with respect to the base of the radial frame and a bent starting frame continuous to the branch starting frame and bent in a radial direction.

However, the grid includes a portion that is apart from the lug portion (in particular, the branch starting frame) on a channel from a lower section toward an upper section along the branch frame, and therefore, a current channel up to the lug portion becomes long, thereby increasing a current pathway, resulting in an increase in electric resistance. Consequently, a potential distribution becomes uneven over the entire electrode plate, thereby raising problems of local corrosion and a short lifetime of the electrode plate.

SUMMARY

The following presents a simplified summary of the invention disclosed herein, in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to enhance the mechanical strength of a grid, and further, reduce the electric resistance of the grid to regularize a potential distribution of the storage battery grid.

A storage battery grid according to an aspect of the present invention includes: a frame bone that includes a substantially rectangular shape; a lug portion that is connected to a first side portion of the frame bone and projects outwardly from the frame bone; a main bone that extends from the first side portion to a second side portion which is opposed to the first side portion; and a plurality of first sub-bones that extend obliquely toward the second side portion, at least part of the plurality of first sub-bones branching from the main bone toward both sides, wherein at least part of the plurality of first sub-bones is bent.

With such a configuration, there can be provided the storage battery grid, in which the electric resistance of the grid is reduced, the potential distribution of the storage battery grid can be made uniform, and the elongation of the grid is suppressed.

BRIEF DESCRIPTION OF THE DRAWINGS

The foregoing and other features of the present invention will become apparent from the following description and drawings of an illustrative embodiment, of the invention in which.

DESCRIPTION OF EMBODIMENTS

A description will be given below of a first embodiment of a storage battery grid according to the present invention with reference to the attached drawings. In the present embodiment, explanation will be made by way of a grid for use in a lead-acid storage battery. Vertical and lateral directions on sheets of the drawings are defined as vertical and lateral directions in the description.

A grid 1 in the present embodiment is used as one member of a positive electrode plate or a negative electrode plate in an electrode group serving as a power generating element for a lead-acid storage battery. In the case where the grid 1 is used for the positive electrode plate, the grid 1 is filled with a positive electrode active material (i.e., lead dioxide). In contrast, in the case where the grid 1 is used for the negative electrode plate, the grid 1 is filled with a negative electrode active material (i.e. spongy lead).

Figure 1:
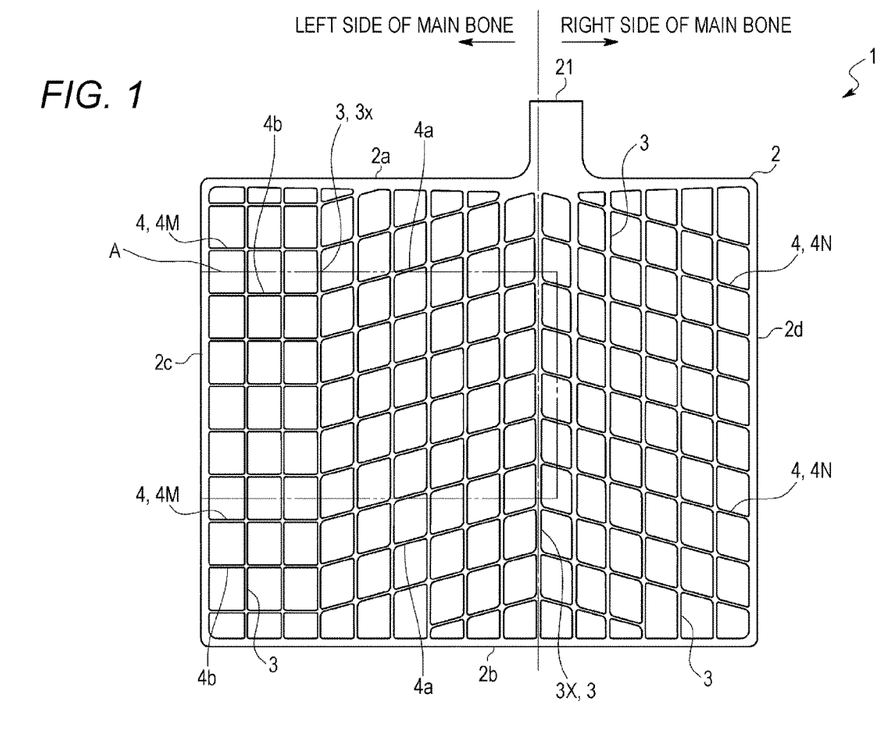
FIG. 1 shows a plan view showing a storage battery grid of a first embodiment.

Specifically, the grid 1 is obtained by blanking a rolled sheet made of a lead alloy in a predetermined thickness. As shown in FIG. 1, the grid 1 includes a frame bone 2, a plurality of vertical bones 3 (second sub-bones) vertically extending in a linear manner inside of the frame bone 2; and a plurality of sub-bones 4 (first sub-bones) obliquely formed inside of the frame bone 2.

The frame bone 2 is formed into a substantially rectangular shape, and includes a first side portion 2a having a lug portion 21 projecting outward of a frame, a second side portion 2b opposed to the first side portion 2a, and third and fourth side portions 2c and 2d substantially perpendicular to the first side portion 2a and the second side portion 2b. The third side portion 2c connects one end of the first side portion 2a and one end of the second side portion 2b to each other. The fourth side portion 2d connects the other end of the first side portion 2a and the other end of the second side portion 2b to each other.

The plurality of vertical bones 3 include one or more main bone 3X (one in the present embodiment) extending downward from right under a connection portion to the lug portion 21 at the first side portion. 2a.

The main bone 3X linearly extends substantially perpendicularly to the first side portion 2a of the frame bone 2 and the second side portion 2b opposed to the first side portion 2a, and is tapered with to gradually reduced width from an upper section to a lower section, as viewed on a plane. In this manner, a portion having a large electric, power in the vicinity of the lug portion serving as a current collector is made thick whereas a portion having a small electric power is made thin, so that a current can be efficiently collected while suppressing the use amount of an electrode plate material.

The plurality of vertical bones 3 arranged on right and left sides of the main bone 3X are arranged at equal intervals in the lateral direction the extending direction) of the first side portion 2a. The plurality of vertical bones 3 arranged on the right and left sides of the main bone 3X may be configured such that the width of each of vertical bones 3 becomes smaller as they are more apart from the main bone 3X. This can make the interval between the vertical bones 3 most suitable for collected electric power.

As shown in FIG. 1, the plurality of sub-bones 4 include sub-bones 4 (4M) arranged on the left side of the main bone 3X and extending obliquely downward, and sub-bones 4 (4N) arranged on the right side of the main bone 3X and extending obliquely downward. The uppermost sub-bones 4M and 4N connected to the main bone 3X extend obliquely downward from right under the connection portion to the lug portion 21 at the first side portion 2a. The ends of some (one in the present embodiment) of the sub-bones 4M are branched from the first side portion 2a and extend obliquely downward. The ends of some of the sub-bones 4M (a lowermost one of the plurality of sub-bones 4M in the present embodiment) and some of the sub-bones 4N (a lowermost one of the plurality of sub-bones 4N in the present embodiment) are located at positions at which they cross not the third and fourth side portions 2c and 2d but the vertical bone 3.

In other words, the upper end of the sub-bone 4-M is connected to the main bone 3X or the first side portion 2a whereas the lower end thereof is connected to the third side portion 2c or the vertical bone 3. In contrast, the upper end of the sub-bone 4N is connected to the main bone 3X whereas the lower end thereof is connected to the fourth side portion 2d or the vertical bone 3.

The plurality of sub-bones 4M are bent once at positions at which they cross the vertical bones 3. Each of the sub-bones 4M is split into two split bones at a bending point, at which they are bent. These two split, bones include a first split bone 4a arranged nearest the main bone 3X and a second split bone 4b that is connected to the first split bone 4a and remotest from the main bone 3X.

Figure 2:
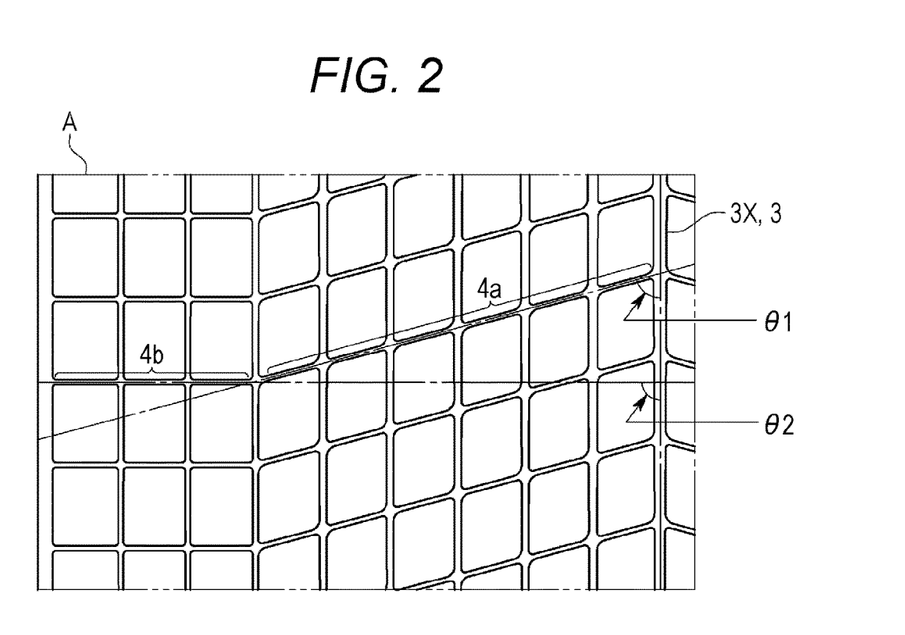
FIG. 2 shows an enlarged view showing a surrounded section A in enlargement.

FIG. 2 shows an enlarged view showing, in enlargement, a surrounded section A in a rectangular shape in FIG. 1. As shown in FIG. 2, the first split bone 4a is arranged such that its inclination angle ($\theta$1) with respect to the main bone 3X is 75°; the second split bone 4b is arranged such that its inclination angle ($\theta$2) with respect to the main bone 3X is 90°. These two split bones 4a and 4b are inclined with respect to the main bone 3X within an angle of less than 90°, and furthermore, the inclination angle ($\theta$2) of the second split, bone 4b is greater than the inclination angle ($\theta$1) of the first split bone 4a.

The inclination angles ($\theta$1 and $\theta$2) of the split bones 4a and 4b with respect to the main bone 3X may be appropriately varied within an angle of less than 90°.

The plurality of sub-bones 4M are bent at positions at which they cross the same vertical bones 3x. That is to say, the bending points between the plurality of sub-bones 4M and the vertical bones ax are located in a vertical direction. The bending point between the first split bone 4a and the Second split bone 4b in each of the plurality of sub-bones 4 is located on the vertical bone 3x.

In the meantime, the sub-bone 4N extends from a connection portion to the first side portion 2a or the main bone 3X linearly from the first side portion 2a toward the second side portion 2b without being bent. The inclination angle of the sub-bone 4N with respect to the main bone 3X is 75°.

Storage battery grids in the present embodiment (Examples 1 to 5) and a storage battery grid for comparison (Comparative Example 1) were subjected to a potential drop analysis, a tensile test, and a potential distribution analysis.

In Examples 1 to 5, like the first embodiment, the sob-bone 4M included the two split bones, that is, the first split bone 4a and the second split bone 4b that were bent once and had the different inclination angles with respect to the main bone 3X.

The inclination angle of the first split bone 4a with respect to the main bone 3X was 75° whereas the inclination angles of the second split bones 4b with respect to the main bone 3X were 90°, 87°, 84°, 81°, and 78°, respectively, as the numbers of the examples became greater. The grids in Examples 1 to 5 had a grid dimension [a width (mm)×a height (mm)] of 137.0×115.0, a predetermined grid thickness (mm), and a grid mass (g) of 36.8.

An expanded grid in Comparative Example 1 had a grid dimension [a width (mm)×a height (mm)] of 137.0×115.0, a predetermined grid thickness (mm), and a grid mass (g) of 36.8.

<Potential Drop and Potential Distribution Analyses>

In Examples 1 to 5 and Comparative Example 1, a potential drop (a voltage drop) and a potential distribution at the second side portion were analyzed when a current of 1 A was made to flow at the upper end of the lug portion with reference (0 V) to the first side portion of the frame bone.

In this case, the rates of a potential drop in Examples 1 to 5 were determined on the assumption that a potential drop in Comparative Example 1 of a conventional expanded grid was 100%. The uniformity of the potential distribution was expressed by ○ (good) or x (no good).

<Tensile Test>

In Examples 1 to 5 and Comparative Example 1, a tensile load was applied in a lateral direction, and then, a tensile test on a CAE analysis was carried out.

In this case, in the same manner as the potential drop analysis, the rates of a tensile elongation in Examples 1 to 5 were determined on the assumption that a tensile elongation in Comparative Example 1 of the conventional expanded grid was 100%.

<Analysis Result>

Figure 3:
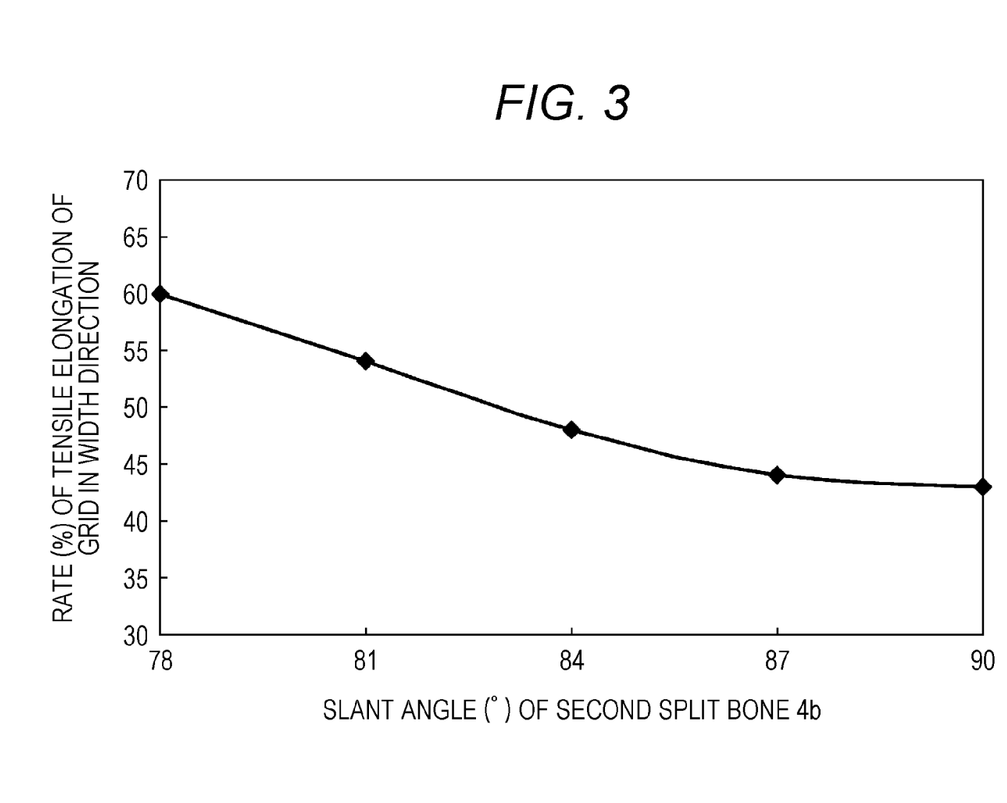
FIG. 3 shows a graph illustrating the correlation between tensile elongation amount and the inclination angle of a second split bone 4b with respect to a main bone in the storage battery grid of the first embodiment.

The results of the potential drop analysis, the tensile test, and the potential distribution analysis are shown in Table 1 and FIG. 3.

becomes greater, the tensile elongation can be suppressed. The best result was produced in Example 1 in which the inclination angle was 90°.

This is because since the tensile load in the extending direction (i.e., the lateral direction) of the second side portion 2b was most exerted on the second split bone 4b arranged remotest from the main bone, the inclination angle of the second split bone 4b was set to be greater than that of the first split bone 4a, so that a component for supporting the tensile load exerted on the second split bone 4b in the lateral direction was increased, thus suppressing a lateral elongation. The lateral elongation could be most effectively suppressed at an inclination angle of 90° at which the lateral component becomes maximum.

The storage battery grid 1 in the first embodiment constituted as described above produces the following advantageous effects.

The grid 1 includes the main bone 3X extending from the connection portion to the lug portion 21 at the first side portion 2a of the frame bone 2 to the second side portion 2b, and therefore, the lug portion 21 and the second side portion

TABLE 1

| | EXAMPLE 1 | EXAMPLE 2 | EXAMPLE 3 | EXAMPLE 4 | EXAMPLE 5 | COMPARATIVE EXAMPLE 1 |
|---|---|---|---|---|---|---|
| INCLINATION ANGLE (°) OF FIRST SPLIT BONE 4a | 75 | 75 | 75 | 75 | 75 | |
| INCLINATION ANGLE (°) OF SECOND SPLIT BONE 4b | 90 | 87 | 84 | 81 | 78 | |
| RATE (%) OF POTENTIAL DROP OF GRID | 57 | 57 | 57 | 56 | 56 | 100 |
| RATE (%) OF TENSILE ELONGATION OF GRID IN WIDTH DIRECTION | 43 | 44 | 48 | 54 | 60 | 100 |
| POTENTIAL DISTRIBUTION | ○ | ○ | ○ | ○ | ○ | x |

As shown in Table 1, the potential drops in Examples 1 to 5 were reduced to 56% or 57% with respect to the potential drop in Comparative Example 1. The uniformity of the potential distribution in Examples 1 to 5 was expressed by ○ (good), and was more excellent than the uniformity of the potential distribution of x (no good) in Comparative Example 1. It is found from the results that the grids for the storage battery according to the present invention in Examples 1 to 5 have a small electric resistance of the grid and a uniform potential distribution of the grid in comparison with the conventional expanded grid in Comparative Example 1.

As shown in Table 1, the tensile elongations in Examples 1 to 5 were reduced to 43% to 60% with respect to the tensile elongation in Comparative Example 1. Consequently, it is found that the storage battery grids according to the present invention in Examples 1 to 5 have a small tensile elongation, that is, suppressed elongation in comparison with the conventional expanded grid in Comparative Example 1.

FIG. 3 shows a graph illustrating the rate of the tensile elongation on a vertical axis, the inclination angle of the second split bone 4b with respect to the main bone on a lateral axis based on the results shown in Table 1. In Examples 1 to 5, it is found that as the inclination angle of the second split bone 4b with respect to the main bone 2b of the frame bone 2 can be connected to each other with the shortest distance. Since the grid 1 partially includes the plurality of sub-bones 4 extending obliquely from the main bone 3X, the channel for the current generated apart from the connection portion to the main bone 3X at the second side portion 2b of the frame bone 2 to the lug portion 21 can be shortened. Consequently; in the entire grid 1, the electric resistance can be reduced and the potential distribution at the grid 1 can be made uniform. In addition, the frame bone 2 is formed into the rectangular shape, thus enhancing a mechanical strength.

In particular, since at least some of the plurality of sub-bones 4 are bent once as they are more separated from the main bone 3X and the sub-bones 4 are bent in the extending direction, that is, the lateral direction of the first side portion 2a (the second side portion 2b), the lateral elongation can be suppressed. As a consequence, the bending angle is appropriately adjusted according to the aspect ratio of the frame bone 2. Thus, when the grid is filled with an active material to form an electrode plate to configure a battery, the falling of the active material an be suppressed and the lifetime performance of the battery can be enhanced, irrespective of the shape of a grid such as a vertically long shape, laterally long shape, or a square shape.

Each of the two split, bones 4a and 4b has an inclination angle of 90° or less with respect to the main bone 3X, and therefore, there is no split bone that is bent in such a manner as to extend from the second side portion 2b toward the first side portion 2a, thus shortening the channel through which the current flows, and making the current distribution uniform.

Out of the two split bones 4a and 4b, the inclination angle (θ2) of the second split bone 4b with respect to the main bone 3X is greater them the inclination angle (θ1) of the first split bone 4a with respect to the main bone 3X, so that the second split bone 4b, on which the lateral tensile stress is liable to be most exerted, is set to be parallel to the second side portion 2b, thereby increasing the component for supporting the tensile load exerted on the second split bone 4b in the lateral direction, and suppressing the lateral elongation.

Since the storage battery grid 1 is formed by blanking, the thickness of the grid 1 can be further reduced in comparison with the case where the grid 1 is formed by casting. In other words, the material of the grid can be reduced, and thus, a cost can be reduced.

The sub-bone 4 is bent at the position at which the sub-bone 4 crosses the vertical bone 3, so that the storage battery grid 1 can be readily fabricated by blanking.

If the sub-bone 4 is not bent at the position at which the sub-bone 4 crosses the vertical bone 3, a corner is formed at the bending point of the sub-bone 4, and as a consequence, a stress is concentrated, thereby breaking the bone. However, in the present embodiment, the sub-bone 4 is bent at the position at which the sub-bone 4 crosses the vertical bone 3, thus eliminating a corner at the bending point and making it difficult to break the sub-bone 4.

A storage battery grid 1 in a second embodiment will be explained with reference to the drawings. The same or corresponding members as those of the storage battery grid 1 in the first embodiment are designated below by the same reference numerals.

Figure 4:
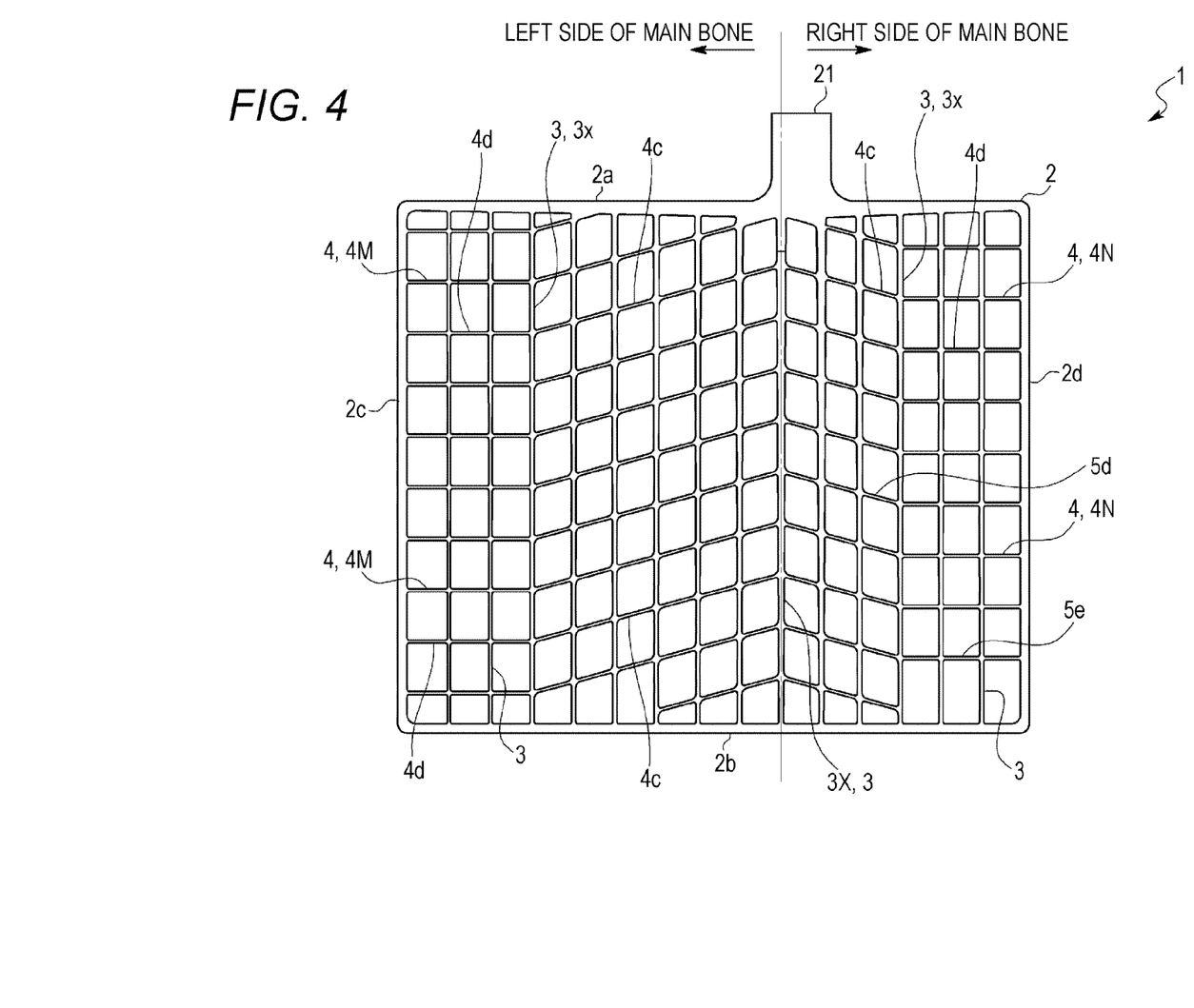
FIG. 4 shows a plan view showing a storage battery grid of a second embodiment.

As shown in FIG. 4, in the storage battery grid 1 in the second embodiment, each of a plurality of sub-bones 4M and 4N is bent once at a position at which each of the sub-bones 4M and 4N crosses a vertical bone 3X and is split into two split bones at a bending point.

The two split bones are a third split bone 4c located nearest a main bone 3X and a fourth split, bone 4d located remotest from the main bone 3X.

The third split bone 4c is located at an angle of 75° with respect to the main bone 3X whereas the fourth split, bone 4d is located at an angle of 90° with respect to the main bone 3X.

With the storage battery grid in the second embodiment configured as described above, both of the first sub-bones 4M and 4N are bent once, and therefore, the lateral elongation of the grid 1 can be suppressed on both sides of the main bone 3X. The storage battery grid in the second embodiment can produce the same advantageous effects as those produced by the storage battery grid in the first embodiment.

A storage battery grid 1 in a third embodiment will be explained with reference to the drawings. The same or corresponding members as those of the storage battery grid 1 in the first embodiment are designated below by the same reference numerals.

Figure 5:
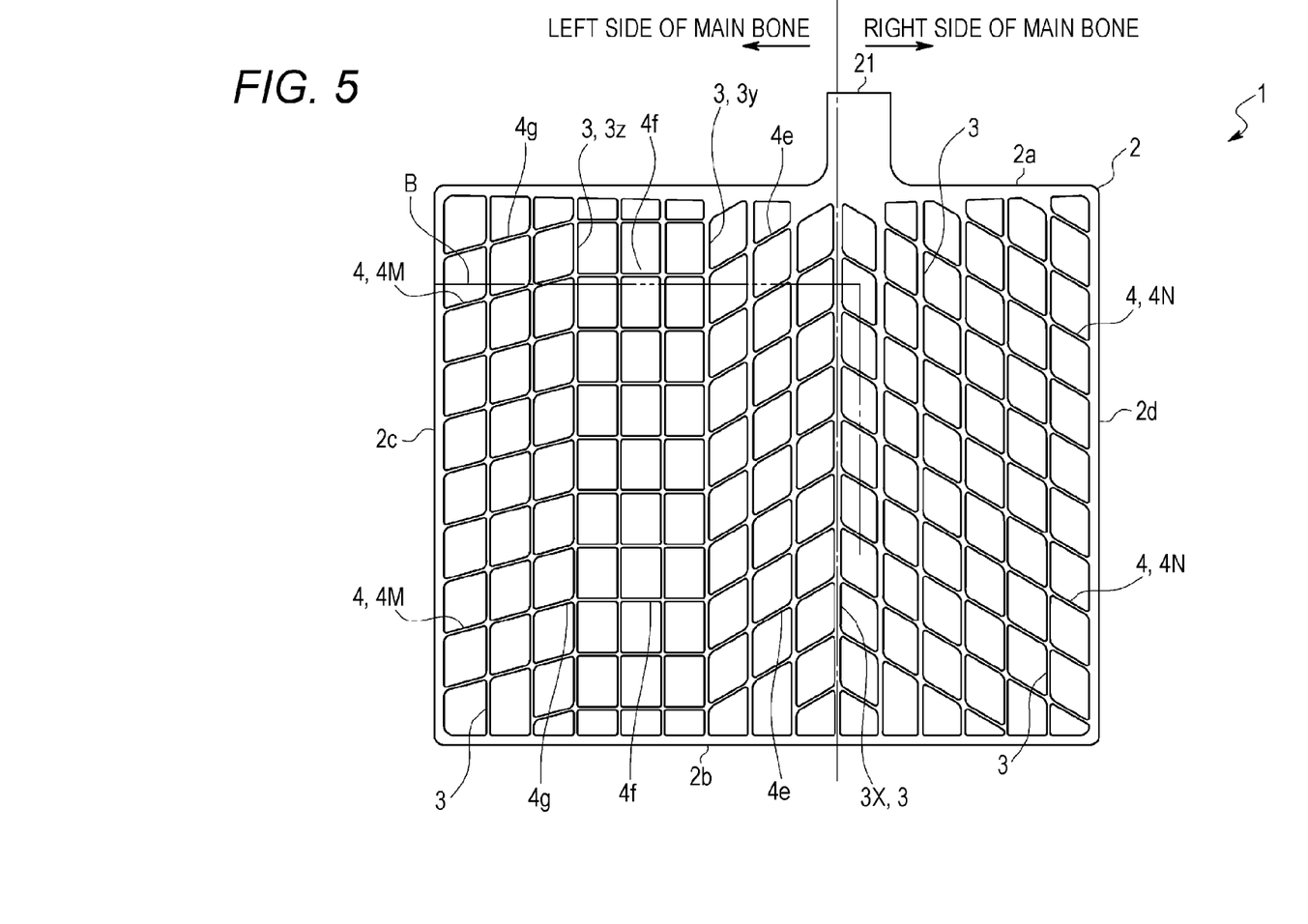
FIG. 5 shows a plan view showing a storage battery grid of a third embodiment.

As shown in FIG. 5, in the storage battery grid 1 in the third embodiment, each of a plurality of sub-bones 4M is bent twice into three split bones.

These three split bones are a fifth split bone 4e located nearest a main bone 3X, a sixth split bone 4f connected to the fifth split bone 4e, and a seventh split bone 4g connected to the sixth split bone 4f and located remotest from the main bone 3X.

Figure 6:
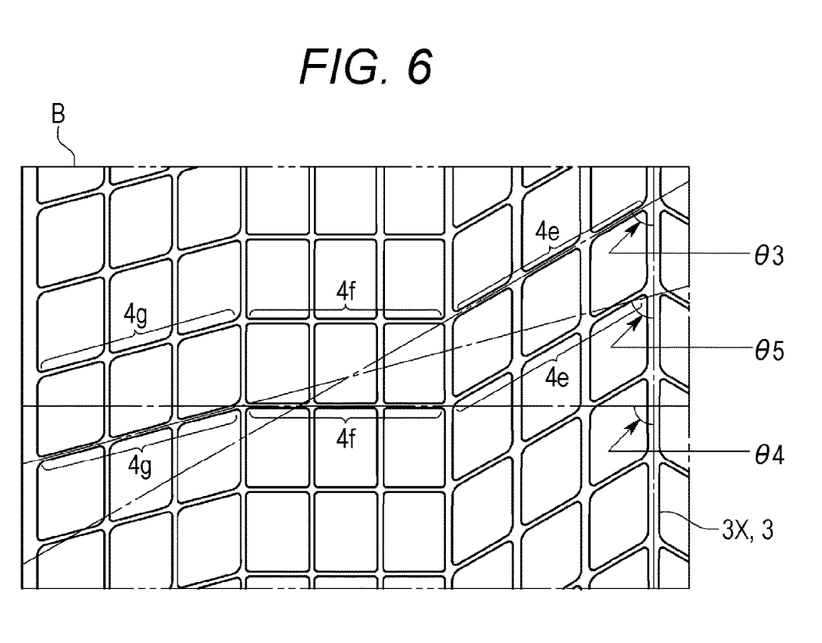
FIG. 6 shows an enlarged view showing a surrounded section B in enlargement.
Figure 7:
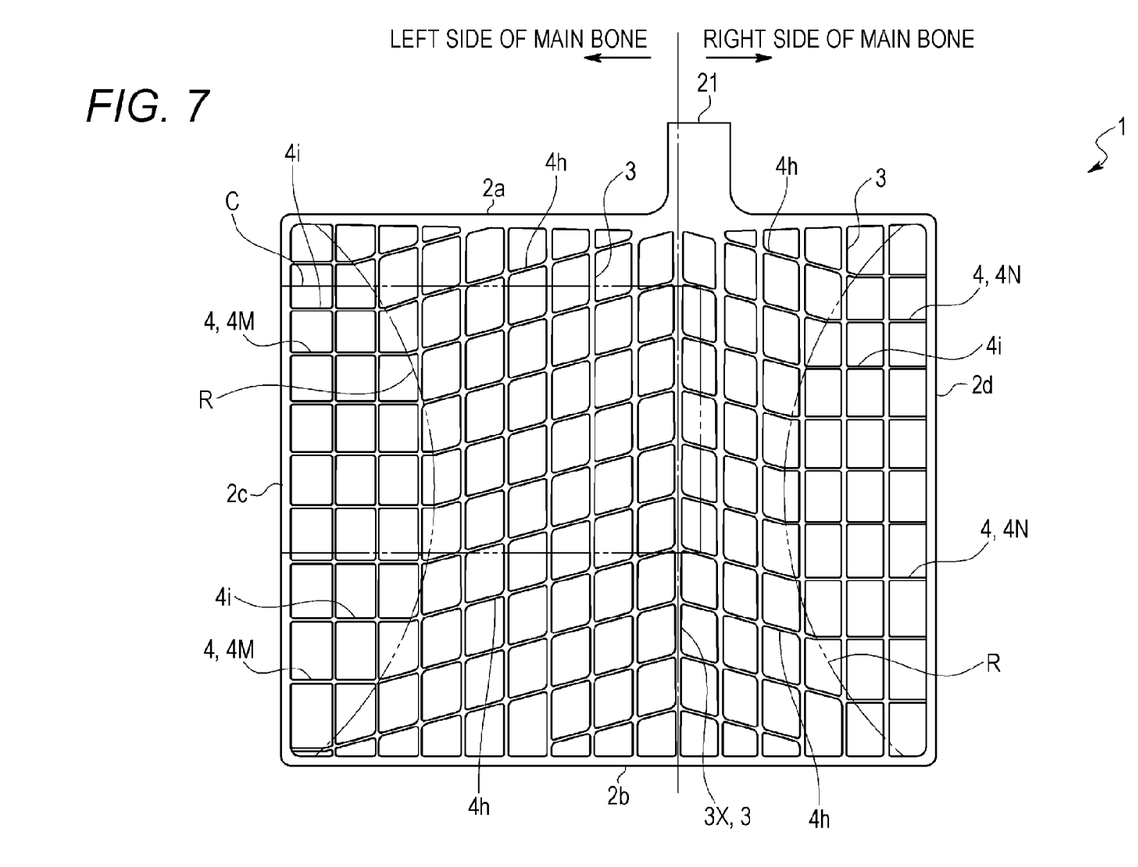
FIG. 7 shows a plan view showing a storage battery grid of a fourth embodiment.

FIG. 6 shows an enlarged view showing, in enlargement, a surrounded section B in a rectangular shape in FIG. 5. As shown in FIG. 7, the fifth split bone 4e is arranged such that its inclination angle. (θ3) with respect to the main bone 3X is 60°, the sixth split bone 4f is arranged such that its inclination angle (θ4) with respect to the main bone 3X is 90° and the seventh split bone 4g is arranged such that its inclination angle (θ5) with respect to the main bone 3X is 75°.

These three split bones 4e, 4f, and 4g are inclined with respect to the main bone 3X within an angle of less than 90°, and further, the inclination angles (θ4 and θ5) of the sixth and seventh split bones 4f and 4g are greater than the inclination angle (θ3) of the fifth split bone 4e.

The respective inclination angles (θ3, θ4, and θ5) of the split bones 4e, 4f, and 4g with respect to the main bone 3X may be appropriately varied within an angle of less than 90°.

The plurality of sub-bones 4M are bent at the same vertical bones 3y and 3z. Specifically, at the plurality of sub-bones 4, the bending point between the fifth split bone 4e and the sixth split bone 1f is located at the vertical bone 3y whereas the bending point between the sixth split bone 4f and the seventh split bone 4g is located at the vertical bone 3z.

Storage battery grids in the present embodiment (Examples 6 to 9) and the storage battery grid (Comparative Example 1) for comparison were subjected to a potential drop analysis and a potential distribution analysis.

In Examples 6 to 9, like the third embodiment, the sub-bone 4M was bent twice to be split into the three split bones, that is, the fifth split bone 4e, the sixth split bone 4f, and the seventh split bone 4g, each of which has the different inclination angles with respect to the main bone 3X.

In Example 6, the inclination angle of the fifth split bone 4e with respect to the main bone 3X was 60°; the inclination angle of the sixth split bone 4f with respect to the main bone 3X was 75°; and the inclination angle of the seventh split bone 4g with respect to the main bone 3X was 90°.

In Example 7, the inclination angle of the fifth split bone 4e with respect to the main bone 3X was 60°; the inclination angle of the sixth split bone 4f with respect to the main bone 3X was 90°; and the inclination angle of the seventh split bone 4g with respect to the main bone 3X was 75°.

In Example 8, the inclination angle of the fifth split bone 4e with respect to the main bone 3X was 75°; the inclination angle of the sixth split bone 4f with respect to the main bone 3X was 60°; and the inclination angle of the seventh split bone 4g with respect to the main bone 3X was 90°.

In Example 9, the inclination angle of the fifth split bone 4e with respect to the main bone 3X was 75°; the inclination angle of the sixth split bone 4f with respect to the main bone 3X was 90°; and the inclination angle of the seventh split bone 4g with respect to the main bone 3X was 60°.

The grids in Examples 6 to 9 had a grid dimension [a width (mm)×a height (mm)] of 137.0×115.0, a predetermined grid thickness (mm), and a grid mass (g) of 36.8. The dimensions of the grid in Comparative Example 1 are described above, and therefore, their explanation will be omitted.

<Experimental Result>

The results of the potential drop analysis and the potential distribution analysis are shown in Table 2.

TABLE 2

|  | EXAMPLE 6 | EXAMPLE 7 | EXAMPLE 8 | EXAMPLE 9 | COMPARATIVE EXAMPLE 1 |
| --- | --- | --- | --- | --- | --- |
| INCLINATION ANGLE (°) OF FIFTH SPLIT BONE 4e | 60 | 80 | 75 | 75 |  |
| INCLINATION ANGLE (°) OF SIXTH SPLIT BONE 4f | 75 | 90 | 60 | 90 |  |
| INCLINATION ANGLE (°) OF SEVENTH SPLIT BONE 4g | 90 | 75 | 90 | 60 |  |
| RATE (%) OF POTENTIAL DROP OF GRID | 56 | 56 | 56 | 56 | 100 |
| POTENTIAL DISTRIBUTION | ○ | ○ | ○ | ○ | x |

As shown in Table 2, the potential drops in Examples 6 to 9 were reduced to 56% with respect to the potential drop in Comparative Example 1. The uniformity of the potential distribution in Examples 6 to 9 was expressed by ○ (good), and was more excellent than the uniformity of the potential distribution of x (no good) in Comparative Example 1. It is found from the results that the grids for a storage battery according to the present invention in Examples 6 to 9 have a small electric resistance of the grid and a uniform potential distribution of the grid in comparison with the conventional expanded grid in Comparative Example 1.

A storage battery grid 1 in a fourth embodiment will be explained with reference to the drawings. The same or corresponding members as those of the storage battery grid 1 in the first embodiment are designated below by the same reference numerals.

As shown in FIG. 7, in the storage battery grid 1 in the fourth embodiment, each of a plurality of sub-bones 4M and 4N is bent once and is split into two split bones at a bending point.

Figure 8:
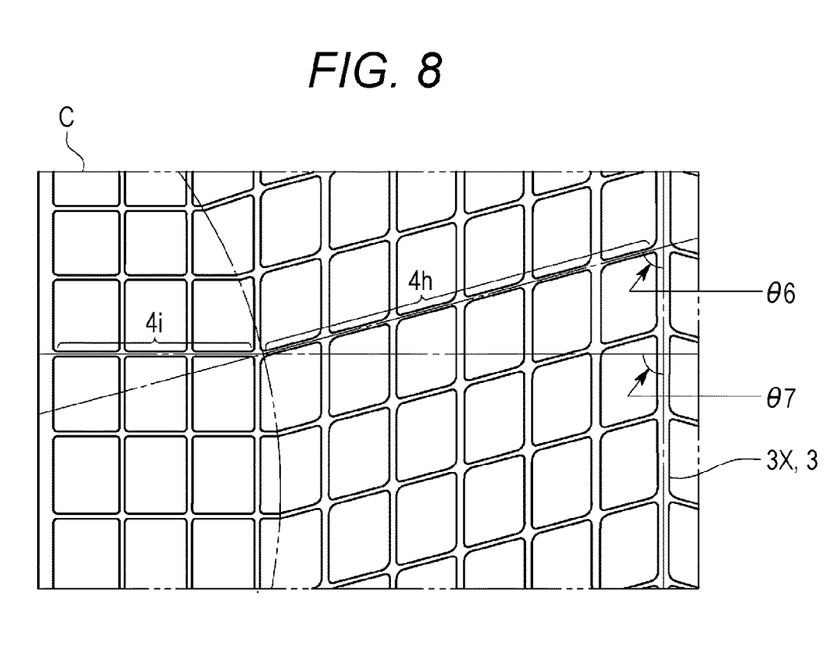
FIG. 8 shows an enlarged view showing a surrounded section C in enlargement.

FIG. 8 shows an enlarged view showing, in enlargement, a surrounded section C in a rectangular shape in FIG. 7. As shown in FIG. 8, the two split bones are a split bone 4h bent at an inclination angle (θ6) of 75° with respect to a main bone 3X and a split, bone 4i bent at an inclination angle (θ7) of 90° with respect to the main bone 3X.

Hence, unlike the first to third embodiments, the bending point, of a sub bone 4 arranged at substantially the center of a third side portion 2c or a fourth side portion 2d is arranged nearer a main bone 3X than a bending point arranged on both sides in a vertical direction. In other words, a seventh split bone 4i arranged at substantially the center of the third side portion 2c or the fourth side portion 2d becomes laterally longer than a seventh split bone 4i arranged on both sides in the vertical direction.

In the fourth embodiment, the bending point is not only arranged at a portion at which the sub-bone 4 crosses a vertical bone 3 but also located between the vertical bones 3. These bending points are not linearly arranged on the vertical bone 3 but arranged such that a substantial are R is plotted with the third side portion 2c or the fourth side portion 2d as a string, as viewed on a plane.

With the storage battery grid 1 in the fourth embodiment configured as described above, the bending point of the sub-bone 4 is located nearer the main bone 3X as the bending point, approaches substantially the center of the third side portion 2c or the fourth side portion 2d, so that the seventh split bone 4i inclined at an angle of 90° with respect to the main bone 3X can be located longer in the lateral direction toward substantially the center of the third side portion 2c or the fourth side portion 2d. As a consequence, a lateral component is increased at substantially the center of the third side portion 2c or the fourth side portion 2d at which a lateral elongation is most liable to occur, thus effectively suppressing the lateral elongation.

A storage battery grid 1 in a fifth embodiment will be explained with reference to the drawings. The same or corresponding members as those of the storage battery grid 1 in the first embodiment are designated below by the same reference numerals.

Figure 9:
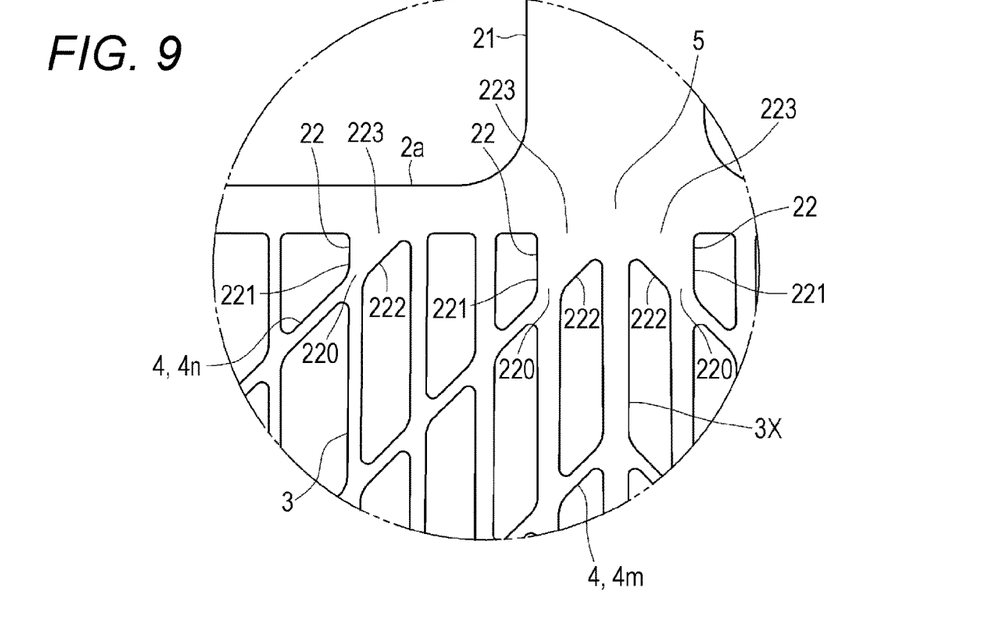
FIG. 9 shows an enlarged view schematically showing an extension of a storage batter grid in a fifth embodiment in enlargement.

As shown in FIG. 9, in the storage battery grid 1 in the fifth embodiment, a plurality of extensions 22 extending downward from an upper side portion 2a within a frame are formed integrally with the upper side portion 2a. At least some of the above-described vertical bones 3 and sub-bones 4 (4n) extend from these extensions 22.

More specifically, as shown in, particularly. FIG. 9, the extension 22 is formed into a triangular shape having a smaller lateral width dimension toward a tip portion 220, as viewed on a plane. In the present embodiment, one vertical bone 3 and one sub-bone 4 (4n) extend from the tip portion 220.

In more detail, the extension 22 includes a first end side 221 extending from the upper side portion 2a toward the tip portion 220 in parallel to the vertical bone 3 and a second end side 222 extending from the upper side portion 2a toward the tip portion 220 in parallel to the sub-bone 4 (4n). The first end side 221 is formed linearly with the vertical bone 3 extending from the tip portion 220; more particularly, the first end side 221 is formed on the same line as the vertical bone 3 on a side remote from a lug portion 21. The second end side 222 is formed linearly with the sub-bone 4 (4n) extending from the tip portion 220; more particularly, the second end side is formed on the same line as the lower side of the sub-bone 4 (4n).

The tip portion 220 continuous to the first end side 221 and the second end side 222 is formed such that its lateral width dimension is substantially the same as that of the sub-bone 4 (4n) extending from the tip portion 220. As described above, the extension 22 is formed into the triangular shape having the smaller lateral width dimension toward the tip portion 220, and further, the lateral width dimension of substantially the entire extension 22 becomes larger than that of the sub-bone 4 (4n). The width dimension of a base end portion 223 of the extension 22 connected to the upper side portion 2a is larger than the sum of the width dimension of the sub-bone 4 (4n) and the width dimension of the vertical bone 3. Since the extension 22 is formed in the above-described manner, the extension 22 is deformed without any breakage in the case where stress is exerted on the grid 1, thereby dispersing the stress occurring between the sub-bone 4 (4*n*) and the upper side portion 2*a*, to thus make the sub-bone 4 (4*n*) hard to be broken.

In the fifth embodiment, the vertical bone 3 also extends from the tip portion 220, and further, the extension 22 is formed such that the lateral width dimension of substantially the entire extension 22 becomes larger than that of the vertical bone 3. Since the extension 22 is formed in the above-described manner, a channel of a current flowing in the upper side portion 2*a* through the vertical bone 3 becomes wider, thereby reducing an electric resistance, to thus make a potential distribution uniform. In addition, in the case where a vertical stress is exerted on the grid 1, the extension 22 is deformed, thereby making the vertical bone 3 hard to be broken. Moreover, not only a lateral stress but also the vertical stress is exerted on the sub-bone 4 (4*n*). The vertical stress can be dispersed to the vertical bone 3, so that the sub-bone 4 (4*n*) is further hardly broken.

At the above-described tip portion 220, a corner defined by the first end side 221 and the upper side of the sub-bone 4 (4*n*) and a corner defined by the second end side 222 and the vertical bone 3 on a side nearer the lug portion 21 are rounded. As a consequence, mechanical strength at the corners is enhanced, thereby further making the vertical bone 3 and the sub-bone 4 (4*n*) hard to be broken, and further reducing the concentration of the stress.

As shown in, particularly. FIG. 9, the extensions 22 are formed on both sides of a main vertical bone 3X also at a connection portion 5 to the main vertical bone 3X at the upper side portion 2*a* in the fifth embodiment.

Figure 10:
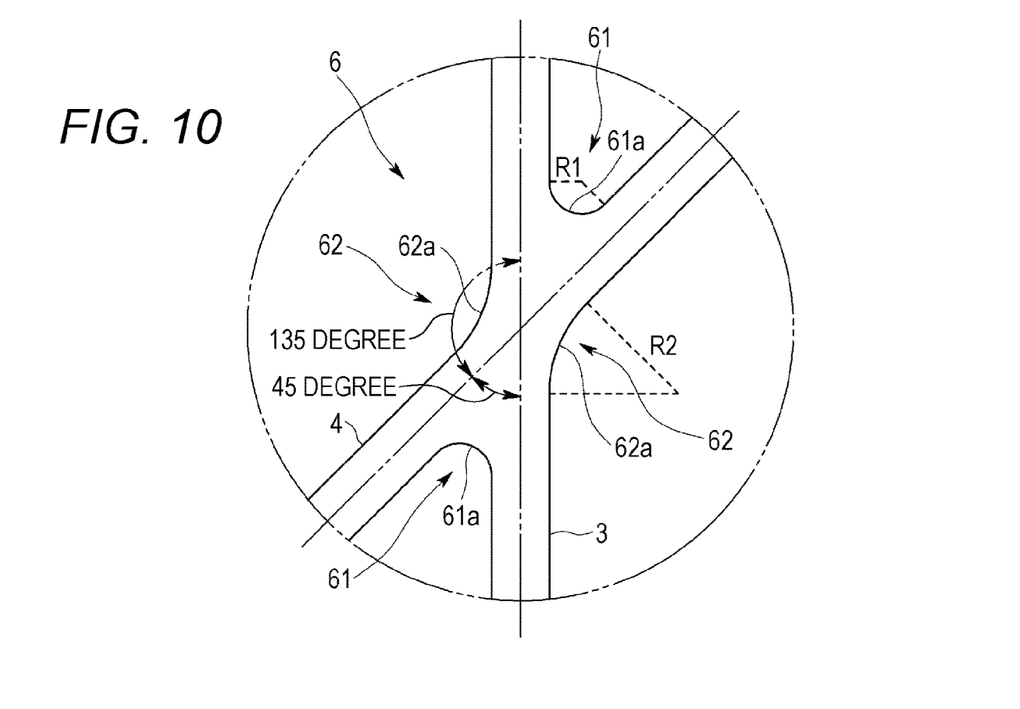
FIG. 10 shows a view schematically showing an intersection at the storage battery grid in the filth embodiment.

Furthermore, an intersection 6, at which the vertical bone 3 and the sub-bone 4 cross each other, is formed, as shown in FIG. 10, in the fifth embodiment. At this intersection 6, a first corner portion 61 having an acute cross angle and a second corner portion 62 having an obtuse cross angle are rounded.

In more detail, the cross angle of the first corner portion 61 is 45° whereas the cross angle of the second corner portion 62 is 135°. These corner portions 61 and 62 are rounded, so that the curvature of a second rounded surface 62*a* of the second corner portion 62 is greater than that of a first rounded surface 61*a* of the first corner portion 61.

In the fifth embodiment, the first rounded surface 61*a* and the second rounded surface 62*a* are rounded such that the second curvature radius R2 of the second rounded surface 62*a* becomes four times the first curvature radius R1, of the first rounded surface 61*a*. The ratio of the curvature radius R1 to the curvature radius R2 may be any other values as long as the curvature of the second rounded surface 62*a* is greater than that of the first rounded surface 61*a*. Moreover, the distance between the first corner portions 61 opposed to each other is greater than that between the second corner portions 62 opposed to each other, and therefore, the first corner portions 61 may not be rounded.

In this manner, the first corner portion 61 and the second corner portion 62 are rounded, so that the distance between the first corner portions 61 opposed to each other and the distance between the second corner portions 62 opposed to each other can be increased, thus enhancing the mechanical strength at the intersection 6 between the vertical bone 3 and the sub-bone 4.

Next, results from potential distribution analyses carried out with respect to the grid 1 configured as described above and a conventional expanded grid will be shown below. The conventional expanded grid had a grid dimension [a width (mm)×a height (mm)] of 137.0×115.0, a grid thickness (mm) of 1.00, and a grid mass (g) of 42.0. In contrast, the lead-acid storage battery grid according to the present invention had a grid dimension [a width (mm)×a height (mm)] of 137.0×115.0, a grid thickness (trim) of 0.80, and a grid mass (g) of 42.0. A current of 1 A was made to flow at the upper end of the lug portion in each of the conventional expanded grid and the lead-acid storage battery grid according to the present invention, followed by a potential distribution analysis.

The rate of a potential drop (i.e., a voltage drop) with reference (0V) to a lower frame of the conventional expanded grid is assumed as 100%. In the case where the slant angle of the sub-bone of the lead-acid storage battery grid according to the present invention is varied from 0° to 80°, the rate of a potential drop with reference (0V) to the lower side portion of the lead-acid storage battery grid according to the present invention and the uniformity of a potential distribution are shown in Table 1.

TABLE 3

| GRID | SLANT ANGLE OF SLANTED BONE | RATE OF POTENTIAL DROP OF GRID (%) | UNIFORMITY OF POTENTIAL DISTRIBUTION OVER ENTIRE GRID | REMARKS |
|---|---|---|---|---|
| CONVENTIONAL EXPANDED GRID | — | 100 | x | PRIOR ART |
| LEAD-ACID STORAGE BATTERY GRID ACCORDING TO PRESENT INVENTION | 0 | 50 | ○ | COMPARATIVE EXAMPLE |
| | 5 | 48 | ⊙ | EXAMPLE |
| | 15 | 48 | ⊙ | EXAMPLE |
| | 25 | 48 | ⊙ | EXAMPLE |
| | 30 | 48 | ⊙ | EXAMPLE |
| | 35 | 48 | ⊙ | EXAMPLE |
| | 45 | 48 | ⊙ | EXAMPLE |
| | 60 | 49 | ⊙ | EXAMPLE |
| | 80 | 50 | ○ | COMPARATIVE EXAMPLE |

* UNIFORMITY OF POTENTIAL DISTRIBUTION . . . ⊙: EXCELLENT, ○: GOOD, x: NO GOOD

The rate of the potential drop of the lead-acid storage battery grid according to the present invention was decreased down to 48% to 50% of that of the conventional expanded grid. The uniformity of the potential distribution of the lead-acid storage battery grid according to the present invention was ⊙ or ○ (excellent or good), that is, the uniformity was more excellent than that of the conventional expanded grid since the uniformity of the potential distribution of the conventional expanded grid was x (no good). In view of this, it was found that the potential distribution of the entire lead-acid storage battery grid according to the present invention was made to be uniform in comparison with that of the conventional expanded grid. The uniformity of the potential distribution of the entire grid when the slant angle of the sub-bone of the lead-acid storage battery grid, according to the present invention ranged from 0° to 80° was ○ (good), and further, the uniformity of the potential distribution when the slant angle of the sub-bone of the lead-acid storage battery grid according to the present invention ranged from 5° to 60° was ⊙ (excellent). It was found from the results that the potential distribution was made to be more uniform within the range from 5° to 60° of the slant angle of the sub-bone of the lead-acid storage battery grid according to the present invention.

In this manner, the use of the lead-acid storage battery grid according to the present invention for a lead-acid storage battery to make the lead-acid storage battery have the same lead mass as that of the conventional expanded grid can enhance a high rate discharge performance (a cold cranking current and a low temperature high rate discharge performance) more than the use of the conventional expanded grid. In the meantime, when an electrode plate for a lead-acid storage battery according to the present invention is used for a lead-acid storage battery, substantially the same high rate discharge performance (a cold cranking current and a low temperature high rate discharge performance) as that of the conventional expanded grid can be achieved by an electrode plate having a smaller lead mass.

The results of elongation analyses carried out with respect to the above-described conventional expanded grid and the above-described lead-acid storage battery grid according to the present invention are shown in Table 2.

view of these, it was found that the grid elongation in each of the width direction and the height direction was decreased in the lead-acid storage battery grid according to the present invention. Consequently, the cycle life performance of the lead-acid storage battery using the grid according to the present invention can be enhanced, for example, the number of cycles in a cycle life test at an ambient temperature of 75° pursuant to the light load lifetime test determined JIS 5301 increased.

With the grid 1 according to the fifth embodiment configured as described above, the space defined by the vertical bone 3 and the sub-bone 4 is formed into the rectangular shape, thus reducing a bypass channel remote from the lug portion 21 compared with the case of the triangular shape. Moreover, the main vertical bone 3X is formed under the lug portion 21, thus shortening the distance between the lug portion 21 and the lower side portion 2b of the frame bone 2. Additionally, the plurality of sub hones 4 (4m) extend obliquely downward from the main vertical bone 3X, thus shortening the channel, at which a current generated sideways of the main vertical bone 3X reaches the lug portion 21 through, the main vertical bone 3X. In addition, the plurality of sub-bones 4 are formed in an inverted V shape on the main vertical bone 3X, as viewed on a plane, thus shortening the channel, at which the current generated on both sides of the main vertical bone 3X reaches the main vertical bone 3X or the lug portion 21. Consequently, it is possible to reduce the electric resistance and make the potential distribution at the electrode plate uniform at the entire grid 1.

The grid 1 of the present embodiment includes the plurality of vertical bones 3 and the plurality of sub-bones 4 but has no lateral bone substantially parallel to the upper side portion 2a of the frame bone 2. Therefore, the channel of the current generated on the right and left sides of the main vertical bone 3X includes only the upward channel formed

TABLE 4

| GRID | SLANT ANGLE OF SLANTED BONE | RATE OF GRID ELONGATION (%) | | REMARKS |
| --- | --- | --- | --- | --- |
| | | WIDTH DIRECTION (LATERAL DIRECTION) | HEIGHT DIRECTION (VERTICAL DIRECTION) | |
| CONVENTIONAL EXPANDED GRID | — | 100 | 100 | PRIOR ART |
| LEAD-ACID STORAGE BATTERY GRID ACCORDING TO PRESENT INVENTION | 0 | 50 | 57 | COMPARATIVE EXAMPLE |
| | 5 | 50 | 57 | EXAMPLE |
| | 15 | 50 | 57 | EXAMPLE |
| | 25 | 60 | 57 | EXAMPLE |
| | 30 | 70 | 43 | EXAMPLE |
| | 35 | 80 | 43 | EXAMPLE |
| | 45 | 80 | 43 | EXAMPLE |
| | 60 | 50 | 43 | EXAMPLE |
| | 80 | 50 | 43 | COMPARATIVE EXAMPLE |

Assuming that each of the rate of a grid elongation in the width direction (i.e., the lateral direction) of the conventional expanded grid and the rate of a grid elongation in the height direction (i.e., the vertical direction) of the conventional expanded grid was set to 100%, the rate of a grid elongation in the width direction in the lead-acid storage battery grid according to the present invention ranged from 50% to 80% of that of the conventional expanded grid whereas the rate of a grid elongation in the height direction ranged from 43% to 57%: namely, they were decreased. In of the vertical bones 3 and the obliquely upward channel formed of the sub-bones 4. The channel reaching the lug portion 21 via the main vertical bone 3X and the upper side portion 2a can be shortened, thus reducing the electric resistance.

In addition, the frame bone 2 is formed into the rectangular shape, thus enhancing a mechanical strength.

In particular, the sub-bone 4 (4n) extends from the extension 22 formed at the upper side portion 2a, and therefore, the extension 22 is deformed even in the case where the lateral stress is exerted on the grid 1, so that the stress concentration occurring locally between the sub-bone 4 (4n) and the upper side portion 2a can be reduced while suppressing the elongation of the grid 1. Moreover, the extension 22 is formed into the triangular shape, and therefore, the extension 22 is entirely deformed, thus further reducing the stress concentration. As a consequence, the sob-bone 4 (4n) is hardly broken.

Since the grid 1 is formed by blanking, the thickness of the grid can be further reduced (that is, the mass of the grid can be further reduced) in comparison with the case where the grid is formed by casting. As a consequence, the material of the grid is reduced, thus reducing a cost. A difference in thickness of the grid is caused by a difference in corrosion mode due to a difference in metallic tissue. In general, a cast grid has a large crystalline grain. Corrosion proceeds in such a manner as to enter a crystalline grain field, and therefore, the cast grid has characteristics of a small corrosion ratio at which the grid is broken. In contrast, the blanked grid manufactured by blanking a rolled sheet is rolled after the fabrication of a slab, so that a large crystalline grain contained in the slab is elongated in a roll direction. In this manner, there is no crystalline grain field that may break the grid, and thus, corrosion sequentially proceeds from the grid surface. With these characteristics, the blanked grid manufactured with the rolling sheet can be reduced in grid thickness in comparison with the cast grid.

The present invention is not limited to the above-described embodiments.

Although the grid used for a lead-acid battery has been exemplified in the above-described preferred embodiments, the present invention is not limited to this. The grid according to the present invention is applicable to a grid filled with an active material for a nickel-metal hydride rechargeable battery and the like.

Moreover, although the grid 1 has been formed by blanking in the above-described preferred embodiments, it may be formed by casting.

Additionally, although the sub-bone has been bent once or twice in the above-described preferred embodiments, it may be bent three times or more. Moreover, the inclination angle of the sub-bone with respect to the main bone may arbitrarily range from 0° to 90°.

In addition, although the bending point of the sub-bone has been located at the position at which the bending point, crosses the vertical bone in the above-described preferred embodiments, the sub-bone may be bent at a position at which the sub-bone does not cross the vertical bone.

Furthermore, although the main bone having the sub-bones branched on both sides thereof has extended immediately under the lug portion in the above-described preferred embodiments, the main bone may be shifted from the lug portion on either side in the lateral direction.

In the case where the sub-bones bent on both sides of the main bone in the lateral direction are located, the bending times of the sub-bone may be different on the right and left sides of the main bone.

Alternatively, only some of the sub-bones extending obliquely downward from the main bone are bent whereas the other sub-bones may not be bent but may straight extend.

Furthermore, the bending times of the plurality of sub-bones that are bent may be different from each other.

Although the extension 22 has been formed into the triangular shape, as viewed on a plane, in the above-described embodiment, it may be formed into any shapes such as other polygonal shapes or a semicircular shape.

The present invention is not limited to the above-described preferred embodiments, and therefore, it may be variously modified without departing from the scope.

The invention claimed is:

1. A storage battery grid comprising:
   a frame bone that includes a substantially rectangular shape, the frame bone comprising a first side portion, a second side portion which is opposed to the first side portion, a third side portion which connects one end of the first side portion and one end of the second side portion;
   a lug portion that is connected to the first side portion of the frame bone and projects outwardly from the frame bone;
   a main bone that extends from the first side portion to the second side portion; and
   a plurality of first sub-bones that branch from the main bone and extend obliquely toward the second side portion,
   wherein all of the plurality of first sub-bones that reach the third side portion are bent and include a plurality of split bones that are split at a bending point as a boundary at which the first sub-bone is bent,
   with respect to each of the plurality of first sub-bones that reach the third side portion, an inclination angle, relative to the main bone, of the split bone remotest from the main bone and connected to the third side portion is greater than an inclination angle of the split bone connected to the main bone, and
   all of the inclination angles of all of the split bones remotest from the main bone and connected to the third side portion and the inclination angles of all of the split bones connected to the main bone are 90° or less with respect to the main bone.

2. The storage battery grid according to claim 1, wherein at each of the plurality of first sub-bones, the inclination angles of the plurality of split bones with respect to the main bone become greater as they are remote from the main bone.

3. The storage battery grid according to claim 1, wherein at least one of the split bones remotest from the main bone and connected to the third side portion is parallel to the second side portion.

4. The storage battery grid according to claim 1, wherein the main bone is connected to a connection portion to the lug portion of the first side portion, and
   the storage battery grid further comprises a plurality of second sub-bones that are arranged at intervals in a direction in which the first side portion of the frame bone extends, and extend from the first side portion to the second side portion.

5. The storage battery grid according to claim 4, wherein the each of the plurality of first sub-bones that reach the third side portion is bent at positions at which the first sub-bone intersects any of the plurality of second sub-bones.

6. The storage battery grid according to claim 1, further comprising:
   an extension that extends from the first side portion inward of the frame, and
   another sub-bone that extends from the extension,
   wherein a width dimension of a base end portion of the extension is greater than that of the another sub-bone.

7. The storage battery according to claim 6, wherein the extension is formed into a triangular shape having a smaller width dimension toward a tip, and
   at least part of the plurality of second sub-bones further extends from a tip portion of the extension.

8. The storage battery according to claim 6, wherein a first corner portion having an acute cross angle and a second corner portion having an obtuse cross angle are rounded at an intersection at which the first sub-bone and the second sub-bone cross each other, and
- a curvature of a rounded surface of the second corner portion is greater than that of a rounded surface of the first corner portion.

9. A storage battery comprising the storage battery grid according to claim 1.

10. The storage battery according to claim 9, wherein the storage battery grid is made from a lead alloy.

11. The storage battery according to claim 9, wherein the storage battery grid is formed by blanking.

12. The storage battery grid according to claim 1 further comprising:
- a second sub-bone that extends from the first side portion to the second side portion,
- wherein the each of the plurality of first sub-bones that reach the third side portion is bent at a point where the first sub-bone intersects the second sub-bone.

13. The storage battery grid according to claim 1 further comprising:
- a second sub-bone that branches from the first side portion and extends toward the second side portion,
- wherein the each of the plurality of first sub-bones that reach the third side portion is bent at a point where the first sub-bone intersects the second sub-bone.

14. A method of manufacturing a storage battery grid comprising:
- forming a frame bone that includes a substantially rectangular shape, the frame bone comprising a first side portion, a second side portion which is opposed to the first side portion, a third side portion which connects one end of the first side portion and one end of the second side portion;
- forming a lug portion that is connected to the first side portion of the frame bone and projects outwardly from the frame bone;
- forming a main bone that extends from the first side portion to the second side portion; and
- forming a plurality of first sub-bones that branch from the main bone and extend obliquely toward the second side portion,
- wherein all of the plurality of first sub-bones that reach the third side portion are bent and include a plurality of split bones that are split at a bending point as a boundary at which the first sub-bone is bent,
- with respect to each of the plurality of first sub-bones that reach the third side portion, an inclination angle, relative to the main bone, of the split bone remotest from the main bone and connected to the third side portion is greater than an inclination angle of the split bone connected to the main bone, and
- all of the inclination angles of all of the split bones remotest from the main bone and connected to the third side portion and the inclination angles of all of the split bones connected to the main bone are 90° or less with respect to the main bone.

15. The storage battery grid according to claim 1, wherein the each of the plurality of first sub-bones that reach the third side portion is bent only once.

16. The method of manufacturing a storage battery grid according to claim 14, further comprising:
- forming a second sub-bone that extends from the first side portion to the second side portion,
- wherein the each of the plurality of first sub-bones that reach the third side portion is bent at a point where the first sub-bone intersects the second sub-bone.

17. The method of manufacturing a storage battery grid according to claim 16, further comprising:
- forming an extension that extends from the first side portion inward of a frame, and
- forming another sub-bone that extends from the extension,
- wherein a width dimension of a base end portion of the extension is greater than that of the another sub-bone.

18. The method of manufacturing a storage battery grid according to claim 14, further comprising:
- forming a second sub-bone that branches from the first side portion and extends toward the second side portion,
- wherein the each of the plurality of first sub-bones that reach the third side portion is bent at a point where the first sub-bone intersects the second sub-bone.

* * * * *